Patented Sept. 30, 1952

2,612,445

UNITED STATES PATENT OFFICE 2,612,445

PROCESS OF MAKING HARDBOARD AND THE LIKE CONTAINING FURFURYL ALCOHOL RESINS

Oswald Spence, Hattiesburg, Miss., assignor to Masonite Corporation, Laurel, Miss., a corporation of Delaware No Drawing. Application July 30, 1949, Serial No. 107,835

4 Claims. (Cl. 92—21)

My invention relates to hardboards and other products bonded under heat and pressure from self-bonding hydrolyzed lignocellulose fiber and partially-condensed furfuryl alcohol resins which have been taken up or sorbed by such fiber in water suspension, and to the methods whereby such resins are caused to be taken up or sorbed by such fiber.

This application is a continuation-in-part of application Serial Number 538,884, dated June 5, 1944, filed in my name and which is now abandoned.

I have discovered that hydrolyzed ligno-cellulose fiber in water suspension has a specific affinity for partially-condensed furfuryl alcohol resins. My invention has as an object the provision of a process utilizing this affinity to effect a uniform and intimate taking up or sorption of furfuryl alcohol resins by hydrolyzed ligno-cellulose fiber in water suspension to form a composite fiber-resin material, which, either alone or with other materials, will be converted into strongly-bonded products by application of consolidating pressure and heat serving to develop the self-bonding properties of the hydrolyzed ligno-cellulose fiber and also to develop the bonding properties of the resins in connection with the curing thereof.

The hydrolysis treatment of the ligno-cellulose material may be effected in various ways, as for example by pressure cooking with water with or without added acid catalyst, but is preferably effected by the action of steam under pressure without added acid catalyzing material, the developed acids, as acetic acid, apparently providing the catalytic effect. While lower pressures may be employed, it is preferred that the hydrolysis be conducted under pressure conditions such that the temperature of hydrolysis is at least 180° C. With ligno-cellulose material derived from annual growths somewhat lower temperatures may be employed than with wood. The hydrolysis may also be carried out in the presence of alkaline materials.

Hydrolysis and defibration can be conducted as separate steps, if desired. In such case the ligno-cellulose material may be at least partly defibrated before hydrolysis, and such further defibration and refinement as is desired may be effected after the hydrolysis has been completed. Preferably, however, hydrolysis and defibration are effected by charging the wood or other ligno-cellulose material in chip form, into a gun or chamber, such for example as described in U. S. patent to Mason No. 1,824,221, and subjecting it therein to the action of high pressure steam, followed by explosive discharge from the gun through a constricted outlet to a region of lower, preferably atmospheric, pressure, whereby the material is disrupted to fiber state. The hydrolysis can be controlled, if desired, as by preliminarily impregnating the chips with suitable proportions of alkaline material to form a buffering agent by combining with the acetic acid which is developed by the steam treatment, and which acid, except for the buffering, might take the hydrolysis so far that fiber strength is too greatly reduced. Sodium or calcium acetate and the like are suitable buffering agents. Alkalis, such as soda ash, may be present during the hydrolysis and, by combining with acids formed during the hydrolysis, in turn form buffering agents.

The hydrolyzed and defibrated ligno-cellulose fiber may contain some separate fibers but consists principally of bundles of fibers. It is preferably refined to reduce the size of bundles of fibers, and screened to remove any remaining coarse bundles of fibers and unexploded wood. The fiber contains water-soluble materials which are considered to result principally from hydrolysis of the hemi-cellulosic material present, and the resistance of the final products to absorption of water will be improved by substantial reduction or removal of water-solubles.

The beating or other refining of the hydrolyzed fiber and the screening and washing out of water-solubles are normally carried out with the fiber in water suspension, and, when the fiber is made into sheets, the sheets are formed directly from the water suspension, into which may may be incorporated suitable sizing agents, such as petrolatum, to secure enhanced resistance to water absorption in the final product.

In accordance with my invention, advantage can be taken of the hydrolyzed ligno-cellulose fiber being normally handled in water suspension by adding the furfuryl alcohol resins to a suspension of such fiber in water. In a suspension of hydrolyzed ligno-cellulose fiber in water, the fiber should not exceed about 5 to 10% (on dry basis of fiber) in order to obtain uniform distribution of the resin on the fiber. The consistency is between about 1 to 10%, preferably about 1 to 3.5% under mill operating conditions, in forming the fiber in water suspensions. Under such conditions, the water is substantially in the continuous phase and the fiber in the disperse phase of the water or aqueous suspension of the fiber. The affinity of such fiber in water suspension for such resins is so considerable and the dispersion and taking up or sorption of the resin by the hydrolyzed ligno-cellulose fiber is so characteristic that it is not necessary to add the furfuryl alcohol resin material until after the refining and screening and washing-out of water-solubles have been done, and losses of resins, as with screen rejects, etc., can be avoided by adding the resin to a water suspension of fiber ready for use, as for example adding it in the fiber stock chest or even in the headbox of the sheet-forming machine immediately prior to the formation of the fiber into sheets. The terms "sorb" and "sorption" are used to include adsorption or absorption or both.

The partially-condensed furfuryl alcohol resins, for which hydrolyzed ligno-cellulose exhibits the affinity herein described, include resins formed by the reaction of two or more compounds, at least one of which compounds, is furfuryl alcohol, or formed by the self-condensation of furfuryl alcohol. Examples thereof are resins formed by the reaction of furfuryl alcohol with aldehydes or aldehyde-forming materials, as formaldehyde, furfural, benzaldehyde, trioxane, methylal, or the like; or resins formed by the reaction of compounds containing phenolic groups such as phenol, cresol, or the like, or mixtures thereof, or containing an amino group such as aniline, hexamethylenetetramine, or the like, with furfuryl alcohol or furfuryl alcohol and furfural or resins formed by self-condensation of furfuryl alcohol.

For forming the furfuryl alcohol resins it is preferred that acid condensing agents be employed, which may be organic acids such as oxalic acid, phthalic, succinic, maleic acid, furoic acid, lactic acid, acetic acid, formic acid or the like, or inorganic acids such as sulfuric acid, hydrochloric acid or the like, or compounds which give an acid reaction in water.

In employing the partially-condensed furfuryl alcohol resins for adding to a water suspension of hydrolyzed ligno-cellulose fiber, they preferably are preliminarily condensed to a point where they are largely or substantially water-insoluble. The condensation may be carried substantially beyond this point, but preferably not to the point at which the resins become solids. The partially-condensed resins, if formed in the presence of water, may be separated from the water present, if desired, although such separation has not been found to be necessary, particularly with resins which remain water-miscible in the early stages of condensation. If the condensation of the resin has been carried to a point at which it is rather viscous, the taking up of the resin by the fiber may be aided by reducing the viscosity of the resin by the use of a solvent, such as acetone, alcohols, or the like. However, solvent recovery may not be practicable, and such use of solvents is preferably avoided by adding the partly-condensed resin to the water suspension of fiber before its condensation has proceeded so far as to develop great viscosity.

The affinity which causes the hydrolyzed ligno-cellulose fiber to take up or sorb the partially-condensed furfuryl alcohol resins when they are added to the water suspension of the fiber appears to be a specific and unique property of hydrolyzed ligno-cellulose fiber. Cellulose fibers, such as cotton or alpha-cellulose pulp, do not have this property, nor does mechanically-reduced wood fiber, such as groundwood fiber, have this property to a substantial extent. The hydrolyzed ligno-cellulose fiber is markedly different in that in water suspension it quickly disperses and takes up or sorbs and apparently becomes coated with the partially-condensed furfuryl alcohol resin, and retains substantially all thereof through to the final product. This property of the hydrolyzed ligno-cellulose fiber is particularly manifested in connection with the use of furfuryl alcohol resins partially-condensed with an acid condensing agent when the suspension of fiber is on the acid side. Such favorable acid conditions are present with ligno-cellulose fiber which has been hydrolyzed with steam at high temperatures and pressures for use in board making processes for example, or with ligno-cellulose fiber which has been hydrolyzed in the presence of small proportions of added acid, preferably under mild hydrolyzing conditions. If alkalis or buffering agents are used in preparing the hydrolyzed ligno-cellulose fiber and the fiber suspension is on the alkaline side or very slightly acid, it may be suitably acidified by addition of acid materials, such as acetic acid.

After the partially-condensed resin has been added to the suspension of hydrolyzed ligno-cellulose fiber and been taken up or sorbed by the fiber, the resin-containing fiber may be separated from the water suspension by any suitable means and subjected to further treatment, depending upon the use to which the material is intended to be put.

While this invention may be used for production of other than flat products, it is particularly useful in connection with the manufacture of board products, such as hardboard or the like, in which heat and pressure are used to develop the self-bonding properties of the hydrolyzed ligno-cellulose fiber and serve at the same time, or in some cases with extra heat treatment, to carry further or complete the cure and set, and develop the bonding properties, of the furfuryl alcohol resins which are employed.

The following examples are illustrative of the invention:

1. A furfuryl alcohol resin in partially-condensed form was prepared in the following manner: Eight and three-tenths pounds of oxalic acid were dissolved in 20 gallons of a 40% water solution of formaldehyde at a temperature of 50° C. Forty gallons of furfuryl alcohol were then added and the temperature again brought to 50° C. The mixture, containing approximately 1 part of oxalic acid, 21 parts of the formaldehyde solution, and 45 parts of furfuryl alcohol by weight, was then held between 50° and 55° C. for about four hours, some cooling being applied when necessary because of the exothermic reaction. At the end of this time the pH was about 2, and the viscosity, as determined by a "Ford" type viscosity cup giving an emptying time of 10 seconds for water at 30° C., was 20.6 seconds at 30° C. (For a description of this cup see Ray C. Martin, N. Y., 1940—Lacquer and Synthetic Enamel Finishes—page 279.) After addition of methyl violet dye for fiber-coloring purposes (used in this example only), the reaction mixture containing the partially-condensed water-insoluble furan resin was cooled to about 30° C. and allowed to stand overnight, and had somewhat higher viscosity when used.

In making the suspension of hydrolyzed ligno-cellulose fiber, hardwood in the form of chips was subjected to the action of high pressure steam in guns of the type hereinbefore referred to. The mode of gun operation on such wood was to bring the steam pressure on the chips up to about 800 p. s. i. in about 30 seconds, and then raise the steam pressure quickly to about 1000 p. s. i., and then discharge the material from this pressure to atmospheric pressure in fiber form. This fiber was suspended in water and refined and screened while in water suspension. With the temperature of the suspension at about 80° C., about 2% of petrolatum on the dry weight of fiber was introduced into the suspension for sizing purposes.

The reaction mixture containing the partially-condensed water-insoluble furan resin was added to the fiber suspension in the headbox of the sheet-forming machine as the suspension was being flowed directly to the sheet-forming mechanism. The fiber suspension at this point had a concentration of about 2%–3% of fiber (on dry fiber basis) and a pH of about 4–5. The addition of the reaction mixture was made in the proportion of about 20%–25% of resin based on dry weight of fiber.

With only such agitation as produced by baffles in the headbox, the resin practically disappeared upon entering the suspension, so quickly was it distributed and taken up by the hydrolyzed lignocellulose fiber.

The composite fiber-resin material was formed into a sheet on the sheet-forming machine in the usual manner, the aqueous liquid being drawn off and the wetlap sheet passed between squeeze rolls to aid in the removal of the moisture.

Sheet lengths 12 feet long cut from the wetlap were dried in a continuous hot air drier in about one hour, the air temperature in the drier being about 340° C. at the entrance end and dropping to about 100° C. at the exit end. While the condensation of the resin was advanced in the drier, such advancement was limited, apparently due to the relatively low temperature within the moisture-containing sheets passing through the drier.

Smaller sheets were cut from these sheets for laminating to make a thicker product. The surfaces of the sheets to be exposed in the laminated products were sprayed with the same partially-condensed furan resin in an acetone solution containing about 60% resin. This surface treatment, while not necessary, is found to give some improvement in the surface characteristics of the final product. To avoid sticking of the sheets to the press platens during the pressing operation, it is advisable to partially cure the resin thus sprayed on the surfaces of the sheets, as by heating at 120° to 130° C. for about 30 minutes, and such procedure was followed in this case. These sheets were humidified to approximately 5% moisture content and 4 of the sheets were stacked together with the sprayed surfaces outside and with films of the phenolic resinous adhesive known as "Tego" glue interposed between the sheets.

This stack was pressed in a hydraulic press provided with steam platens for about 10 minutes at a pressure of about 1750 p. s. i., with heating steam at about 100 p. s. i. in the platen cavities. This pressure would cause a platen temperature of about 170° C., but the internal temperature was somewhat higher, probably because of exothermic reaction. The pressed boards were chilled in the press with maintained pressure to a temperature below 100° C. before release of pressure and removal. On trimming, the resulting board product, which was about ½" thick and contained approximately 16%–20% of retained resin, had substantially the following properties:

| | |
|---|---|
| Specific gravity | 1.4 |
| Surface hardness, Rockwell M scale | 87 |
| Edge hardness, Rockwell M scale | 70 |
| 48-hr. water absorption | .7 |
| 48-hr. water swelling | .3 |
| 48-hr. 1% NaOH absorption | .9 |
| 48-hr. 1% NaOH swelling | .5 |
| Flexural strength p. s. i. | 11300 |
| Bond strength p. s. i. | 720 |

2. Hardwood chips were impregnated with soda ash solution sufficient to provide in the chips subjected to hydrolysis about 10% of soda ash, based on dry weight of fiber. The chips were hydrolyzed and disintegrated by treatment with steam in a gun, the steam pressure being raised to about 600 p. s. i. in about 60 seconds, then raised rapidly to about 1000 p. s. i., held at about that pressure for about 9 seconds, and then discharged. Glacial acetic acid was added to bring the pH of the suspension from about 9 to about 4. The fiber was refined and screened in water suspension and about 2½% of petrolatum was added. Approximately 20% (based on dry fiber) of substantially the same resin as in Example 1 was added to the fiber suspension with stirring, and the resin-containing fiber was formed into sheets on a stationary screen. The sheets were dried at about 130° C. and humidified, laminated and hot pressed substantially as described in connection with Example 1. The boards produced had a fluxural strength of about 17500 and had low water uptake and good alkali resistance.

Boards were similarly made with additions ranging from 5% to 40% of the same furan resin. The maximum flexural strength was secured with about 30% of added resin; and the bond strength and alkali resistance of the board products increased with increasing resin content throughout the range used.

3. The hydrolyzed fiber used was prepared from wood chips under somewhat milder conditions in the gun by bringing the pressure up to about 400 p. s. i. in about 30 seconds, then quickly up to 1000 p. s. i. and promptly discharging the material. The resulting hydrolyzed fiber was refined and screened in water suspension with addition of petrolatum size, and substantially the same furan resin as in Example 1 was added to the water suspension of fiber in amount corresponding to 10% on dry fiber content and the mixture agitated.

Sheets were formed from the resin-fiber suspension, and lightly pressed for mechanical removal of water, leaving about 45% to 55% moisture in the sheets (% on weight of the moist sheets). After initial application of higher pressure, they were then hot pressed at a pressure of about 175 p. s. i. and at a temperature of about 200° C. for about ten minutes with wire mesh against one face of the sheets to permit escape of water and vapor. These single-ply or unlaminated board products were removed from the press without cooling the press platens, and had a specific gravity of about 1 and a flexural strength of about 10,000. A board similarly made without the addition of the resin had a flexural strength of about 6,400. The hot-pressed resin-containing boards were then baked without pressure for an hour at 160° C. to further cure the furan resin. Their flexural strength and water and alkali resistance were improved by this baking treatment.

4. The hydrolyzed fiber was prepared about as in Example 1. The resin used was prepared by condensing about 35 parts (by weight) of furfuryl alcohol with about 15 parts of furfural, using about 1 part of oxalic acid as a condensing agent, the condensation being carried to a viscosity of approximately 49 seconds at 30° C. (Ford cup). The partially-condensed resin was added to the water suspension of the fiber with stirring and in amount to provide about 20% on the dry weight of the fiber. Sheets were formed on a stationary screen, air dried, and precured by heating in an oven without pressure for about 1 hour at about 130° C. The moisture content of the sheets was then brought to about 5% on the dry weight of the fiber and the sheets were pressed between platens at about 210° C. and pressure of about 2100 p. s. i. for 2 minutes, after first breathing (releasing the pressure in the press to permit escape of vapor) 3 times at 45-second intervals. The boards were removed from the press without cooling. The boards had a flexural strength of about 16,000, and their alkali resistance and resistance to absorption of water was much greater than that of boards similarly made but without the resin addition.

5. A furfuryl alcohol resin in partially polymerized form was prepared in the following manner: 235 pounds furfuryl alcohol, 170 pounds water and 2.5 pounds phthalic anhydride were refluxed at 100° C. for 3 hours. (Viscosity—Ford Cup, 22 minutes at 30° C.) The viscous material so produced was subjected to vacuum evaporation for 8 hours at 55° C. and then for 6 hours at 90° C. The yield was 187 pounds of partially polymerized furfuryl alcohol resin (Viscosity—Ford Cup, 42 seconds at 100° C.). The acid number of this material was 3.5 (milligrams sodium hydroxide per gram sample) and contained 93% solids.

The partially polymerized furfuryl alcohol resin was added to a water suspension of hydrolyzed lignocellulose fiber (about 2-3% fiber slurry) in an amount equal to about 20% of resin based on the dry weight of the fiber. The resin distributed rapidly through the slurry and was quickly taken up by the hydrolyzed fiber.

The resin-fiber material was formed into a sheet and pressed in a hydraulic press provided with steam heated platens. The sheet was pressed at a pressure of 250 pounds per square inch and at a temperature of 210° to 220° C. for 1 minute, followed by further pressing at 2000 pounds per square inch and at a temperature of 210° C. to 220° C. for 1½ minutes.

The board thus formed had the following characteristics as compared to a blank board made in the same manner except no partially polymerized furfuryl alcohol resin was added to the fiber slurry of the blank:

|  | No Resin Added | Resin Added |
|---|---|---|
| Specific Gravity | 1.25 | 1.36 |
| Dry Flexural Strength Per Square Inch | 12,000 | 11,750 |
| Wet Flexural Strength Per Square Inch | 7,550 | 13,850 |
| Water Absorption: | | |
| 24 Hour, percent uptake | 9.4 | 1.8 |
| 48 Hour, percent uptake | 13.1 | 2.6 |
| 48 Hour, percent swell | 8.0 | 0 |
| Residual strength, percent | 63.2 | 117.9 |
| 24 Hour 0.5 Percent NaOH: | | |
| absorption, percent | 22.0 | 1.4 |
| swelling, percent | 18.1 | 2.1 |
| Rockwell Hardness "R" | 105 | 122 |

6. Partially polymerized furfuryl alcohol resin made substantially as described in Example 5 was added to water suspensions of hydrolyzed ligno-cellulose fiber (2-3% slurries) in amounts equal to 3% and 6% respectively based on the dry weight of the fiber. The resin distributed rapidly in the aqueous slurries and was quickly taken up by the fiber in each slurry.

The resin-fiber materials were formed into sheets and pressed in a platen press at elevated temperature and pressure to form boards having a specific gravity of about 1. The pressing was done by first drying the sheets between heated press platens at a temperature of about 210° C. After drying, the hydraulic pressure then reduced to 450 pounds per square inch then reduced to 185 to 210 pounds per square inch while the temperature of the platens was kept at about 210° C. The overall time for the pressing cycle was 8 minutes.

The boards thus formed had the following characteristics as compared to a blank board made in the same manner except no resin was added to the slurry or wet mix of the blank:

|  | No Resin Added | 3% Resin Added | 6% Resin Added |
|---|---|---|---|
| Specific Gravity | 1.01 | 1.01 | 1.01 |
| Dry Flexural Strength (p. s. i.) | 4,600 | 7,225 | 8,100 |
| Percent Water Uptake 24 hour | 25 | 18.1 | 13.1 |
| Percent Swelling 24 hour | 15.9 | 10.0 | 8.3 |

The affinity which has been found to exist between hydrolyzed ligno-cellulose fiber and partially polymerized furfuryl alcohol resins may be utilized in conjunction with drying oils to obtain improved characteristics in products. In such cases the addition of partially polymerized furfuryl alcohol resin to the water slurry of hydrolyzed fiber may be made in very small quantities and improved products are obtained.

7. In the following example several sheet products are described and compared to show that quantities of partially polymerized furfuryl alcohol added in amounts as low as .175% based on the dry weight of the fiber to a water slurry of hydrolyzed lignocellulose (2 to 3% slurry), impart very good improvement to the product. The furfuryl alcohol resin used was prepared substantially similar to the resin described in Example 5.

The three boards used in the comparison study were prepared under the same conditions, except as to differences noted in the table below, from hydrolyzed fiber slurries, sheeted and pressed in steam heated platen presses. The pressing of the sheets in the platen press was done under conditions similar to the pressing conditions described in Example 6. The resulting boards had the following characteristics:

|  | Board Number | | |
|---|---|---|---|
|  | 1 | 2 | 3 |
| Percent Tung Oil added to Hydrolyzed Fiber Slurry |  | 1.75 | 1.75 |
| Percent Furfuryl Alcohol Resin Added to the Hydrolyzed Fiber Slurry |  |  | .175 |
| Board Specific Gravity | 1.06 | 1.06 | 1.05 |
| Dry Flexural Strength (p. s. i.) | 5,150 | 7,260 | 7,960 |
| Bond Strength (p. s. i.) | 186 | 282 | 369 |
| Water Absorption: | | | |
| 24 Hour Uptake Percent | 18.3 | 16.3 | 13.2 |
| 48 Hour Uptake Percent | 26.0 | 24.5 | 20.4 |
| 24 Hour Swelling Percent | 10.9 | 9.7 | 8.9 |
| 48 Hour Swelling Percent | 15.6 | 13.5 | 12.0 |

The hydrolyzed ligno-cellulose fiber containing the resin, as for example dried sheets thereof, after being given a precuring treatment if desired, may be broken up and comminuted as by grinding, and used for general molding purposes as a molding compound or constituent of a molding compound. In such case it may be desirable to add the partially-condensed furfuryl alcohol resin in more substantial proportions, as about 40%–50% on weight of dry fiber, and to secure increased plasticity properties in the hydrolyzed ligno-cellulose fiber itself as by increased time of exposure to high pressure steam in the hydrolysis treatment.

The viscosity of the partially-condensed resin added to the fiber suspension may vary widely. When the resin begins to condense, its viscosity is slightly greater than water, that is, with Ford cup emptying time not much in excess of 10 seconds. Partially-condensed resins can be used at viscosities ranging from this initial viscosity to viscosities in the order of 200 seconds or higher, at which the resins are quite viscous, but can be used by dissolving in a solvent as previously described. For board making, varying proportions of furfuryl alcohol resins have been employed, ranging from about .175% to about 50% of resin on dry weight of fiber. In the manufacture of board products, a proportion of furan resin in the range of about 10% to 30% gives optimum results, but smaller proportions, such as 5% or less may advantageously be used to develop certain desirable properties, while for molding powders or the like higher proportions, say, up to 40% to 50% of the furan resin may be desirable.

Precuring and final baking of products made from the composite material containing hydrolyzed ligno-cellulose fiber and furfuryl alcohol resins are disclosed in some of the examples for advancing or completing the cure of the furan resins. Such treatment may be varied to suit the hot pressing conditions being used, the extent of condensation treatment given to the resin, the degree of fiber hydrolysis treatment, and the like. An approximate range of 110°–175° C. may be used for precuring or stoving, for example. In some cases both precuring and final baking may be used, or sometimes but one, and in other cases both may be dispensed with.

In one of the examples, addition of the furfuryl alcohol resins was carried out with only such agitation as resulted from having baffles in the headbox, and in another example embodying milder hydrolysis the addition of resin was performed with stirring. In general, the milder the hydrolyzing action is, the more desirable is the use of agitation to assist in distributing the resin in the fiber suspension.

The fiber-resin sheets of the examples were formed on wire screens, and in some cases, the hot pressing was done on a wire screen, but substantially no adhesion of resin to such screen or accumulation of resin on the screen was encountered. The pressing may be against surfaces etched to produce patterns on the final product, or the products may be bent or given other desired conformation in the pressing treatment.

While about 5% of moisture content is preferable in the boards containing furfuryl alcohol resin which are to be pressed without a screen between the boards and a platen and with breathing of the press, such moisture content may vary considerably, as for example from about 1% to 10%.

In general, the incorporation of the partially-condensed resin as hereinbefore described markedly decreases the water absorption and increases the resistance of the final products to the action of chemicals, and betters their electrical properties. In many cases considerable improvement is obtained in physical characteristics of the board products, such as the bond strength, hardness, and flexural strength.

The scope of the claims is not to be limited to the examples, which are presented for purposes of illustration and not for limitation.

I claim:

1. An improved method of producing hardened resin-fiber sheet material which comprises slurrying hydrolyzed lignocellulose fiber in water to form a suspension of fiber in water at a consistency of about 1 to 10%, adding to the fiber suspension from about 0.175% to about 50%, based on the dry fiber weight, of a liquid synthetic resin characterized by specific affinity for the hydrolyzed lignocellulose fiber whereby substantially all of the added resin is deposited uniformly throughout the suspended fibers, said resin comprising essentially a partially condensed water-insoluble furfuryl alcohol resin, removing the water of the suspension from the composite of fiber and resin, and heating and pressing the composite of fiber and resin at temperatures and pressures sufficient to secure bonding of the fiber into a hardened product.

2. The method as set forth in claim 1, and wherein the water suspension of the hydrolyzed fiber is acid and the partially condensed furfuryl alcohol resin is formed from furfuryl alcohol.

3. The method as set forth in claim 1, and wherein the furfuryl alcohol resin is formed from furfuryl alcohol and formaldehyde.

4. The method as set forth in claim 1, and wherein the furfuryl alcohol resin is formed from furfuryl alcohol and furfural.

OSWALD SPENCE.

REFERENCES CITED

The following references are of record in the file of this patent:

UNITED STATES PATENTS

| Number | Name | Date |
|---|---|---|
| 2,080,077 | Howard et al. | May 11, 1937 |
| 2,080,078 | Mason et al. | May 11, 1937 |
| 2,173,391 | Ellis | Sept. 19, 1939 |
| 2,197,724 | Hovey | Apr. 16, 1940 |
| 2,208,511 | Ellis | July 16, 1940 |
| 2,234,188 | Morgan et al. | Mar. 11, 1941 |
| 2,325,570 | Katzen | July 27, 1943 |
| 2,338,602 | Schur | Jan. 4, 1944 |
| 2,345,543 | Wohnsiedler et al. | Mar. 28, 1944 |
| 2,373,690 | Kenda | Apr. 17, 1945 |
| 2,367,312 | Reineck | Jan. 16, 1945 |
| 2,429,329 | Reineck et al. | Oct. 21, 1947 |

OTHER REFERENCES

Paper Trade Journal, May 13, 1943, pages 39–42.

Paper Trade Journal, March 30, 1944, pages 35–38.

Paper Industry and Paper World, June 1943, pages 263–269.